(12) United States Patent
Shamarao et al.

(10) Patent No.: US 9,875,211 B2
(45) Date of Patent: Jan. 23, 2018

(54) SIGNAL CONDITIONER FOR HIGH-SPEED DATA COMMUNICATIONS

(71) Applicant: Synaptics Incorporated, San Jose, CA (US)

(72) Inventors: Prashant Shamarao, Cupertino, CA (US); Jeffrey Lukanc, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 316 days.

(21) Appl. No.: 14/731,378

(22) Filed: Jun. 4, 2015

(65) Prior Publication Data

US 2016/0357699 A1   Dec. 8, 2016

(51) Int. Cl.
*H05K 7/10*     (2006.01)
*G06F 13/42*    (2006.01)
*G06F 13/38*    (2006.01)
*G06F 13/40*    (2006.01)

(52) U.S. Cl.
CPC ........ *G06F 13/4282* (2013.01); *G06F 13/385* (2013.01); *G06F 13/4018* (2013.01)

(58) Field of Classification Search
CPC . G06F 13/4282; G06F 13/385; G06F 13/4018
USPC .............................. 710/315–316; 370/395.43
See application file for complete search history.

(56) References Cited

U.S. PATENT DOCUMENTS

| | | | | |
|---|---|---|---|---|
| 5,838,680 A | * | 11/1998 | Noiri .................. | H04L 12/5601 370/395.7 |
| 5,838,681 A | * | 11/1998 | Bonomi ................. | H04L 49/25 370/395.41 |
| 6,052,738 A | * | 4/2000 | Muller ................ | G06F 13/1689 709/213 |
| 6,230,229 B1 | * | 5/2001 | Van Krevelen ......... | G06F 13/36 710/107 |
| 6,237,053 B1 | * | 5/2001 | Herrod ................ | G06F 9/44505 710/65 |
| 6,553,035 B1 | * | 4/2003 | Schwartz ............ | H04L 49/3027 370/412 |
| 6,728,252 B1 | * | 4/2004 | Kato ...................... | H04L 49/40 370/400 |

(Continued)

OTHER PUBLICATIONS

SN54ALS873B,SN54AS873A,SN74ALS873B,SN74AS873A Dual 4-Bit D-Type Latches With 3-State Outputs revised Aug. 1995 Texas instruments.*

*Primary Examiner* — Paul R Myers
(74) *Attorney, Agent, or Firm* — Patterson + Sheridan, LLP

(57) ABSTRACT

A method, signal conditioning circuit, and system are disclosed to perform signal conditioning using a processing component coupled with at least first and second inputs. The processing component is further coupled with a first output port including first and second data lanes operable at different data rates. The method includes receiving, via the first input and at a first data rate, data included in a first input signal, and receiving, via the second input and at a second data rate different from the first data rate, data included in a second input signal. The method further includes driving, based on the first and second input signals, a first output signal onto the first output port, which includes transmitting the data included in the first input signal on the first data lane, and transmitting the data included in the second input signal on the second data lane.

20 Claims, 5 Drawing Sheets

(56) References Cited

U.S. PATENT DOCUMENTS

| | | | |
|---|---|---|---|
| 6,865,154 B1* | 3/2005 | Charny | H04Q 11/0478 370/229 |
| 7,356,628 B2* | 4/2008 | Swartzentruber | G06F 13/4022 370/392 |
| 7,417,979 B2* | 8/2008 | Enzmann | H04L 12/2803 370/352 |
| 7,903,558 B1* | 3/2011 | Dropps | H04L 47/26 370/232 |
| 7,975,051 B2* | 7/2011 | Saint Clair | H04L 41/06 370/352 |
| 8,237,624 B2 | 8/2012 | Zeng et al. | |
| 8,352,773 B2 | 1/2013 | Chuang et al. | |
| 8,380,912 B2 | 2/2013 | Jaramillo | |
| 8,645,585 B2 | 2/2014 | Wyatt et al. | |
| 8,665,928 B1* | 3/2014 | Klein | H04L 25/247 327/147 |
| 8,683,190 B2 | 3/2014 | Cornelius et al. | |
| 8,819,323 B2* | 8/2014 | Nishiyashiki | G06F 13/36 710/242 |
| 8,879,680 B2 | 11/2014 | Tresidder et al. | |
| 2006/0274774 A1* | 12/2006 | Srinivasan | H04L 41/0809 370/420 |
| 2007/0177701 A1 | 8/2007 | Thanigasalam | |
| 2008/0069115 A1* | 3/2008 | Jensen | H04L 47/24 370/395.41 |
| 2009/0279473 A1 | 11/2009 | Lu et al. | |
| 2010/0080331 A1 | 4/2010 | Garudadri et al. | |
| 2011/0113219 A1* | 5/2011 | Golshan | G06F 9/44505 712/30 |
| 2011/0309948 A1 | 12/2011 | Montgomery et al. | |
| 2012/0215950 A1 | 8/2012 | Anderson | |
| 2012/0311359 A1* | 12/2012 | Jaramillo | H04L 25/0298 713/321 |
| 2012/0317607 A1 | 12/2012 | Wyatt et al. | |
| 2013/0073774 A1* | 3/2013 | Lin | G06F 13/4072 710/316 |
| 2013/0223552 A1 | 8/2013 | Okada | |
| 2013/0340024 A1 | 12/2013 | MacDougall | |
| 2014/0132835 A1* | 5/2014 | Ma | H04N 5/222 348/465 |
| 2015/0261718 A1* | 9/2015 | Campbell | G06F 13/4286 710/302 |
| 2016/0191313 A1* | 6/2016 | Chen | H04L 12/12 370/315 |

* cited by examiner

| | Inputs Active | | | Allocation | |
|---|---|---|---|---|---|
| Source Device | DP (DP 1.3, unidirectional @ 8.1 Gbps) | USB1 (USB 3.1, bidirectional @ 10 Gbps) | USB2 (USB 3.1, bidirectional @ 5 Gbps) | PCIe (PCIe 3.0, bidirectional @ 8 Gbps) | Connection 402A | Connection 402B |
| 630 — Mobile Computing Device | 2 | 1 | 0 | 0 | 2 lanes: DP @ 8.1 Gbps<br>2 lanes: USB1 @ 10 Gbps | 4 lanes unused |
| 635 — Personal Computer | 4 | 0 | 0 | 0 | 4 lanes: DP @ 8.1 Gbps | 4 lanes unused |
| 640 — Personal Computer | 4 | 1 | 1 | 0 | 4 lanes: DP @ 8.1 Gbps | 2 lanes: USB1 @ 10 Gbps<br>2 lanes: USB2 @ 5 Gbps |
| 645 — Workstation | 0 | 1 | 0 | 1 | 2 lanes: USB1 @ 10 Gbps<br>2 lanes: PCIe @ 8 Gbps | 4 lanes unused |
| 650 — Workstation | 0 | 1 | 1 | 2 | 2 lanes: USB1 @ 10 Gbps<br>2 lanes: USB2 @ 5 Gbps | 4 lanes: PCIe @ 8 Gbps |
| 655 — Workstation (Thunderbolt) | 4 | 0 | 0 | 2 | 4 lanes: DP @ 8.1 Gbps | 4 lanes: PCIe @ 8 Gbps |
| 660 — Workstation | 2 | 1 | 1 | 1 | 2 lanes: DP @ 8.1 Gbps<br>2 lanes: PCIe @ 8 Gbps | 2 lanes: USB1 @ 10 Gbps<br>2 lanes: USB2 @ 5 Gbps |

FIG. 6

SIGNAL CONDITIONER FOR HIGH-SPEED DATA COMMUNICATIONS

BACKGROUND

Field

Embodiments of the present disclosure generally relate to signal conditioning for high-speed data communications.

Description of the Related Art

The ongoing development of high-speed data communications standards supports ever-increasing data rates for electronic devices. The additional bandwidth made available through the increased data rates can support a consolidation of different types of data communications onto a reduced number of physical connections. In some cases, docking connectors can be included in portable electronic devices to enable the device to access multiple external resources, such as different types of data and power connections, through a single removable connection.

As newer, faster communications standards are developed, older ("legacy") standards and associated hardware face obsolescence without a deliberate accommodation of the legacy standards within the newer standards. For example, a Universal Serial Bus (USB) 3.0 port can support legacy USB 2.0 communications through dedicated data lanes.

SUMMARY

One embodiment described herein includes a signal conditioning arrangement that comprises a first input configured to receive data included in a first input signal at a first data rate, and a second input configured to receive data included in a second input signal at a second data rate different from the first data rate. The signal condition arrangement further comprises a processing component coupled with the first and second inputs. The processing component is configured to drive a first output signal based on the first and second input signals onto a first output port that includes at least first and second data lanes operable at different data rates. Driving the first output signal comprises transmitting the data included in the first input signal on the first data lane, and transmitting the data included in the second input signal on the second data lane.

Another embodiment described herein includes a method of signal conditioning using a processing component coupled with at least first and second inputs and further coupled with at least a first output port including first and second data lanes operable at different data rates. The method includes receiving, via the first input and at a first data rate, data included in a first input signal, and receiving, via the second input and at a second data rate different from the first data rate, data included in a second input signal. The method further includes driving, based on the first and second input signals, a first output signal onto the first output port. Driving the first output signal includes transmitting the data included in the first input signal on the first data lane, and transmitting the data included in the second input signal on the second data lane.

Another embodiment described herein includes a system that comprises one or more source devices configured to produce a first signal at a first data rate, and a second signal at a second data rate different from the first data rate. The system further comprises a signal conditioning arrangement including at least first and second inputs coupled with respective outputs of the one or more source devices, and further including at least a first output port. The signal conditioning arrangement is configured to receive the produced first and second signals at the first and second inputs, and to drive a first output signal onto the first output port based on the received first and second signals, the first output port including at least first and second data lanes operable at different data rates. Driving the first output signal comprises transmitting the data included in the first input signal on the first data lane; and transmitting the data included in the second input signal on the second data lane.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 6 is a chart illustrating an exemplary set of allocations for a signal conditioning arrangement, according to one embodiment.

Figure 1:
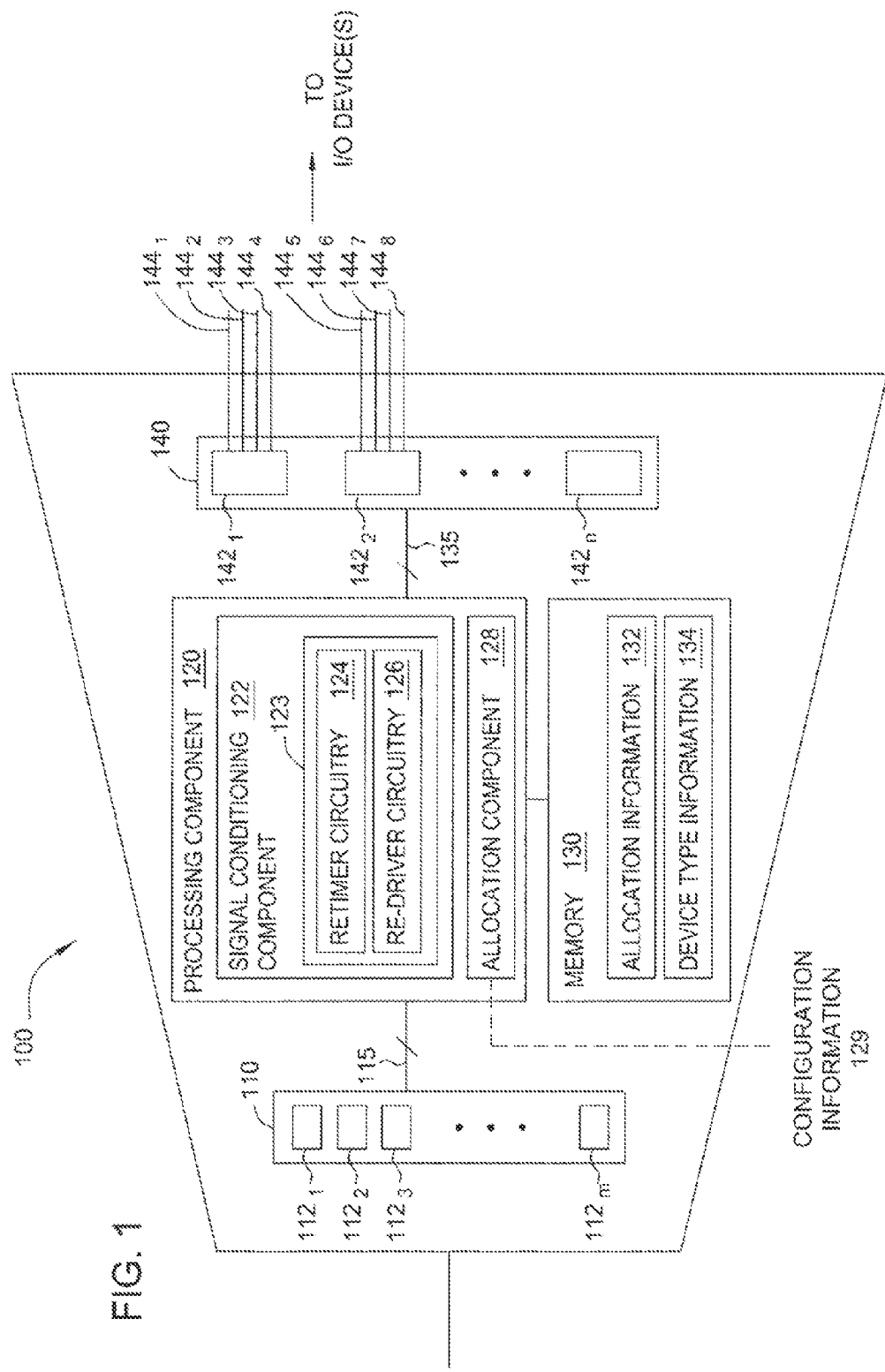
FIG. 1 illustrates a signal conditioning arrangement, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present invention are directed to a signal conditioning arrangement that is configured to receive input signals corresponding to different data rates, and to drive output signals that are based on the input signals onto one or more output ports. In some embodiments, the signal conditioning arrangement is able to allocate input signals onto particular data lanes of the output ports. In some cases, the data lanes of a single output port may be driven with output signals having different data rates and perhaps corresponding to different communications standards.

In some embodiments, the signal conditioning arrangement may be used in conjunction with legacy electronic devices or systems. The signal conditioning arrangement enables the legacy communications to be mapped, translated, or otherwise transferred onto newer architectures, which extends the service life of the legacy devices by providing a simplified interface with current electronic devices. In some embodiments, the signal conditioning arrangement may be used to support single-connection (or fewer-connection) docking solutions for electronics devices.

FIG. 1 illustrates a signal conditioning arrangement 100, according to one embodiment described herein. The signal conditioning arrangement 100 may alternately be referred to as a signal conditioning circuit. The signal conditioning arrangement 100 includes a set of inputs 110 that are communicatively coupled (e.g., via a bus 115) with a processing component 120. The input signals received at the inputs 110 are processed by the processing component 120, and the processing component drives output signals based on the received input signals to a set of outputs 140 (e.g., via a bus 135).

The signal conditioning arrangement 100 may be implemented using any suitable technology, such as complementary metal-oxide-semiconductor (CMOS). In some embodiments, the signal conditioning arrangement 100 may be included as part of an integrated circuit providing additional functionality, included as a separate integrated circuit, included as separate communicatively coupled integrated circuits (e.g., on a printed circuit board), and so forth. The input signals provided to signal conditioning arrangement 100 may have any suitable form, such as electrical, electromagnetic, optical, etc. and may be differential signals, single-ended signals, etc.

As will be discussed in greater detail below, the input signals received at the inputs 110 may comprise signals that comply with different signaling or communications standards or specifications. Accordingly, the various input signals may include data transmitted at differing data rates and/or with different electrical parameters (e.g., different voltage levels). Table 1 lists several exemplary standards, as well as whether the communications are unidirectional or bidirectional, how many communication lanes may be supported, and supported data rates (in gigabits per second—Gbps—or megabits per second—Mbps) for the communication lanes.

TABLE 1

| Standard | Unidirectional or Bidirectional | Number of lanes supported | Supported date rates (Gbps/lane) |
| --- | --- | --- | --- |
| DisplayPort 1.3 | Unidirectional | 1, 2, 4 | 1.62, 2.7, 5.4, 8.1 |
| Universal Serial Bus (USB) 3.1 | Bidirectional | 1, 2, 4 | 5, 10, (Legacy: 480 Mbps/lane) |
| Peripheral Component Interface Exchange (PCIe) 3.0 | Bidirectional | 1, 2, 4, 8, 16, 32 | 2.5, 5, 8 |
| Thunderbolt 2.0 | Bidirectional | 1, 2, 4 | 10, 20 |

DisplayPort™ is a trademark of the Video Electronics Standards Association. PCIe® is a registered trademark of the Peripheral Component Interconnect Special Interest Group (PCI-SIG). Thunderbolt™ is a trademark of Intel Corporation in the U.S. and/or other countries. USB™ and USB Type-C™ are trademarks of the USB Implementers Forum.

As shown, each of the exemplary communication standards may differ in directionality, lanes, data rates, etc. Of course, the person of ordinary skill will understand that the preceding standards are merely examples, and that many other communications standards may be used consistent with the principles and techniques described herein. The other communications standards include any suitable standard, whether existing or hereinafter developed, and whether industry-accepted or proprietary.

The set of inputs 110 may include one or more input ports $112_{1-m}$ (collectively referred to as input ports 112). The input ports 112 may have any suitable implementation capable of receiving input signals, e.g., including conductive pins or pads, optical fibers or waveguides, wireless receivers or antennas, and so forth. In some embodiments, an input port 112 (or a group of certain ones of the input ports 112) may correspond to a discrete connector, which allows a removable attachment with a separate source device. When attached to (or otherwise connected with) the input port(s) 112, the source device(s) provide the input signals to the inputs 110. Any suitable number of input ports 112 may be provided, such as one, two, three, four, or more. In some cases, the signal conditioning arrangement 110 may be configured to combine or consolidate a number of different input signals onto as few as a single output port 142. Accordingly, in some embodiments, the number of input ports 112 may exceed the number of output ports 142. In some embodiments, the different input signals may correspond to different communication standards and/or data rates.

In some embodiments, the input ports 112 may each correspond to one or more data lanes. Each data lane is generally configured to support the transmission of an input signal, and may include one, two, or more conductive traces or wires, optical fibers or waveguides, wireless channels, and so forth. In some embodiments, an input port 112 corresponds to a plurality of data lanes.

The bus 115 generally connects the inputs 110 with processing component 120 and may comprise a plurality of traces, wires, fibers, waveguides, and so forth. It is noted that while the discussion of the signal conditioning arrangement 100 is primarily directed to unidirectional data transfers from inputs 110 to outputs 140, it is expressly contemplated that the signal conditioning arrangement 100 may be configured to support alternative directions of data transfers. The supported data transfers may include bidirectional data transfers (i.e., also including transfers from outputs 140 to inputs 110), data transfers between different input ports 112 and/or output ports 142, and so forth.

The processing component 120 generally operates to receive the input signals from the inputs 110, to process the received input signals, and to drive output signals based on the processed, received input signals to selected ones of the outputs 140. The processing component 120 may have any suitable form, such as a general purpose microprocessor, a controller, an application-specific integrated circuit, and so forth. In some embodiments, the processing component 120 comprises parts of (or all of) one or more integrated circuits (ICs) and/or other circuitry components. In some embodiments, the processing component 120 also comprises electronically-readable instructions, such as firmware code, software code, and the like. In some embodiments, components comprising the processing component 120 are located together, such as being included in a common printed circuit board.

The processing component 120 may be implemented as a set of modules or components that handle different functions of the processing component 120. Each module or component may comprise circuitry that is a part of the processing component 120, firmware, software, or a combination thereof. In various embodiments, different combinations of modules may be used. Example components include a signal conditioning component 122, and an allocation component 128, although other components are possible.

Processing component 120 is further coupled with a memory 130. The memory 130 may include a variety of computer-readable media selected for their size, relative performance, or other capabilities: volatile and/or non-volatile media, removable and/or non-removable media, etc. Memory 130 may include registers, cache, random access memory (RAM), storage, etc. Storage included as part of memory 130 may typically provide a non-volatile memory for the signal processing component 120, and may include one or more different storage elements such as Flash memory, a hard disk drive, a solid state drive, an optical storage device, and/or a magnetic storage device.

As shown, processing component 120 includes a signal conditioning component 122 configured to condition received input signals. In some embodiments, the signal conditioning component 122 includes repeater circuitry 123 to increase the integrity of received signals by compensating for channel noise. For example, the repeater circuitry 123 may operate to reduce jitter of a received input signal. The repeater circuitry 123 includes at least one of retimer circuitry 124 and re-driver circuitry 126, and in some cases may include both. The re-driver circuitry 126 is an analog signal amplifier that operates by equalizing the received signal and transmitting the equalized signal as an output, often without performing any retiming of the signal. The retimer circuitry 124 may also equalize received signals, but includes clock data recovery (CDR) circuitry configured to sample (i.e., digitize) the equalized signal. Generally, the re-driver circuitry 126 may be better suited for relatively slower data rates, such as about five (5) Gbps or less, while the retimer circuitry 124 may provide suitable performance for data rates exceeding five (5) Gbps (in addition to the slower data rates). However, re-driver circuitry 126 and retimer circuitry 124 may be used at other data rates falling outside of these general guidelines.

As discussed above, the input signals received at the processing component 120 may comply with different communications standards, which in some cases correspond to different data rates. Of course, even for input signals compliant with a same standard, several different data rates may be available based on the particular session or initialization process. The repeater circuitry 123 included in the signal conditioning component 122 may be configured to support a number of input signals having different data rates. In some embodiments, the signal conditioning component 122 may include a plurality of separate channels within retimer circuitry 124 or re-driver circuitry 126, where each channel is configured to repeat one or more input signals at a particular data rate.

In some embodiments, the signal conditioning component 122 may include multiple retimers within retimer circuitry 124 and/or multiple re-drivers within re-driver circuitry 126. In some embodiments, the signal conditioning component 122 may include both retimer circuitry 124 and re-driver circuitry 126, and the input signals may be routed to the appropriate type of repeater circuitry 123 based on one or more properties of the input signals. In one embodiment, the allocation component 128 may perform this routing function. As one example of a property of the input signal, the processing component 120 may determine the data rate of the input signal, and responsively route the input signal to one of the retimer circuitry 124 and re-driver circuitry 126 based on the determined data rate. As discussed above, retimer circuitry 124 may provide superior performance relative to re-driver circuitry 126 for data rates exceeding a particular threshold data rate, such as five (5) Gbps. Other considerations may influence the selection of retimer circuitry 124 and/or re-driver circuitry 126 for processing a particular input signal, such as prioritizing according to the type of data (e.g., audio, video, communication data) included in the input signal, the relatively lesser power consumption of re-driver circuitry 126, and so forth. For example, one routing scheme may by default route an input signal to re-driver circuitry 126 unless the determined data rate exceeds the threshold data rate, in which case the input signal would be routed to retimer circuitry 124. Of course, other routing schemes are possible.

The processing component 120 also includes an allocation component 128 configured to allocate received input signals to particular ones of the outputs 140. Outputs 140 may include one or more output ports $142_{1-n}$, each of which may include one or more data lanes 144. As shown, output port $142_1$ includes four data lanes $144_{1-4}$, and output port $142_2$ includes four data lanes $144_{5-8}$. Of course, varying numbers of lanes may be possible. As will be discussed in greater detail below, the outputs 140 may be removably coupled with one or more input/output (I/O) devices.

The allocation component 128 may be configured to analyze the input signals received by inputs 110, and based on one or more properties of the input signals, perform allocation of the input signals to particular outputs 140. As defined herein, allocation encompasses any suitable physical or logical mapping of the input signals to particular outputs. Some non-limiting examples of allocation include updating a logical assignment for routing the data included in the input signals, operating physical switches to form electrical or optical paths between selected physical input ports 112 and output ports 142, and so forth.

In some embodiments, the allocation component 128 is configured to allocate particular input ports 112 to particular output ports 142, or particular data lanes of the input ports 112 to particular data lanes 144 of the output ports 142. The allocation information 132 may be stored in memory 130 in any suitable form (e.g., tabular data), and accessed or updated as desired. In some embodiments, the processing component 120 is configured to initialize communications sessions with the output ports 142 and/or with the input ports 112 according to particular communications standards, such as a standard-specific controller IC (e.g., a USB controller) might typically perform.

Analysis of the received input signals by the allocation component 128 may include determining any number of properties of the received input signals. In some embodiments, the determined properties may include the data rate of the input signal, the type of data included in the input signal, and so forth. The allocation component 128 may further determine a type of an I/O device connected with the outputs 140 (or inputs 110), which in some cases may be based on the content of data received from the I/O device. For example, when an I/O device is connected with the signal conditioning arrangement 100, the processing component 120 (or an alternative processing element coupled with the inputs 110 or outputs 140) may be used to discover the device and establish a communications session using appropriate parameters. As part of the discovery process or the initialization of communications, the processing component 120 may receive data from the I/O device that identifies the specific device, or perhaps specifies a type of device or a class of devices to which the device belongs. In some cases, the data received from the I/O device may be referenced against device type information 134 stored in memory 130 to determine the type of the connected I/O device. Alternatively, the received data may be used to update the device type information 134. In some embodiments, one or more of the outputs 140 may be bi-directional, allowing a device coupled to one of the output ports 142 to communicate data to the signal conditioning arrangement 100. Such data may be used by the allocation component 128 to allocate data received on an input 110 to retimed or re-driven for output onto a certain output port 142. For example, if only one of two devices connected to the output ports 142 supports video data, the allocation component 128 may allocate video data received on the input ports 112 to the output port 142 that supports video.

In some embodiments, the allocation component 128 independently determines the allocations of input signals to outputs. However, in some embodiments, the allocation component 128 may receive configuration information 129 used to control and/or influence the allocation determinations. The configuration information 129 may be provided by another component or device external to the processing component 120. For example, a central processing unit (CPU) of a computing device may be communicatively coupled with the processing component 120, and the CPU may be involved in coordinating the operation of the allocation component 128 by providing the configuration information 129.

The signal conditioning component 122 and allocation component 128 may be communicatively coupled and may interact in any suitable fashion during the operation of the processing component 120. In one example, the signal conditioning component 122 operates on the received input signals before the allocation component 128 allocates the conditioned signals onto the outputs 140. In another example, the allocation component 128 performs allocation of the received input signals before the signal conditioning component 122 conditions the input signals. In yet another example, the allocation component 128 performs an analysis on the received input signals without contemporaneously performing the allocation function, and the determined properties (e.g., data rates) are used to select a type of repeater circuitry 123 used in the signal conditioning component 122. Other interactions between the signal conditioning component 122 and allocation component 128 may be possible.

In some embodiments, the signal conditioning component 100 supports bidirectional (i.e., two-way) communications. For example, during a particular communications session, certain of the output ports 142 (or perhaps one or more lanes 144 of the output ports 142) may be configured to receive data from the I/O devices, and certain of the input ports 112 (or lanes thereof) may be driven with output signals by the processing component 120. In some embodiments, the allocation component 128 manages the configuration of both the input ports 112 and output ports 142, which in some cases includes initializing the communication sessions with connected devices. The processing component 120 may operate to receive input signals through output ports 142, and to decompose or otherwise redistribute the signals carried on different lanes, to condition the signals using the signal conditioning component 122, and to drive output signals based on the conditioned signals to various input ports 112. In some embodiments, the signal conditioning component 100 supports communications between devices connected to different input ports 112 (or to different output ports 142).

Figure 2:
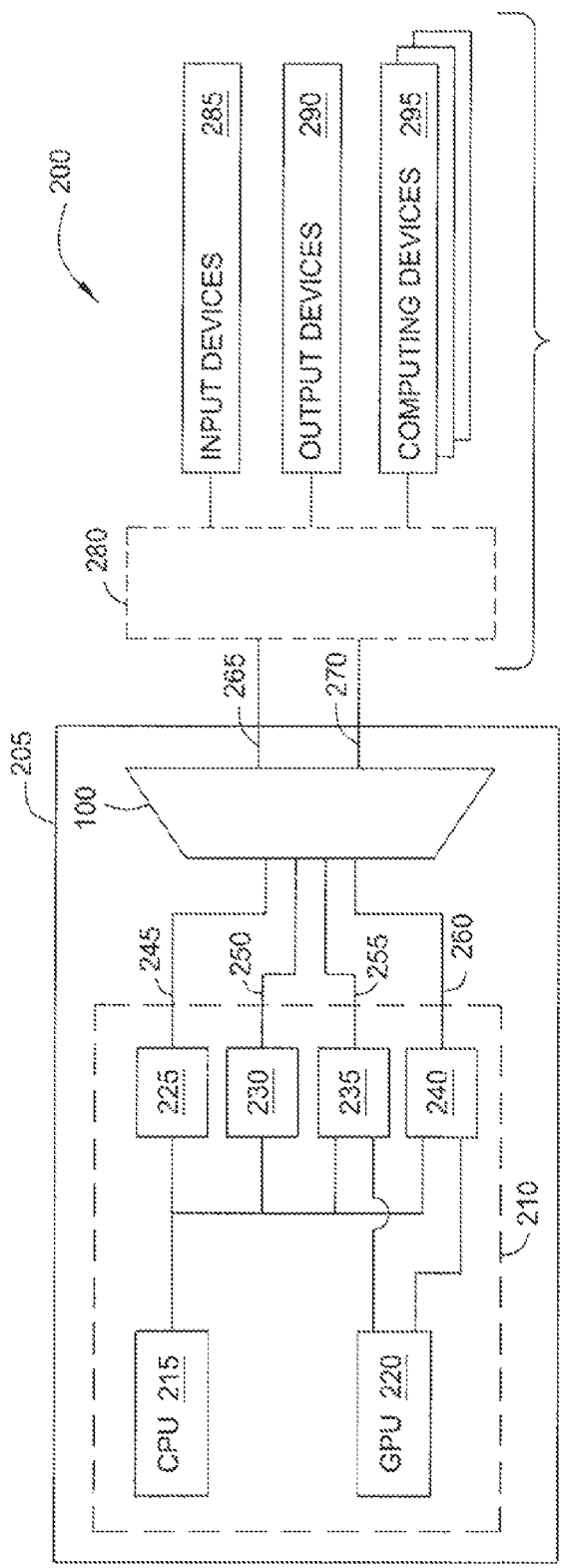
FIG. 2 illustrates a system including a signal conditioning arrangement, according to one embodiment.

FIG. 2 illustrates a system 200 including a signal conditioning arrangement, according to one embodiment. Specifically, the system 200 illustrates one possible implementation in which the signal conditioning arrangement 100 is included as part of a computing device 205. The computing device 205 may have any suitable form factor, such as desktop computers, laptop computers, netbook computers, tablets, web browsers, e-book readers, and personal digital assistants (PDAs). Other non-limiting examples of the computing device 205 include remote terminals, kiosks, and video game machines (e.g., video game consoles, portable gaming devices, and the like). Further examples include communication devices (including cellular phones, such as smart phones), and media devices (including recorders, editors, and players such as televisions, set-top boxes, music players, digital photo frames, and digital cameras).

As shown, the computing device 205 includes a central processing unit (CPU) 215 and a graphics processing unit (GPU) 220 providing various processing functions to the computing device 205. In addition to the CPU 215 and/or GPU 220, the computing device 205 generally includes a chipset that includes one or more electronic components that interface with the CPU 215 and/or GPU 220 and with other components. In some cases, the CPU 215, GPU 220, chipset, and some or all of the components may be included on one or more printed circuit boards (PCBs; such as a motherboard and/or connected daughterboards). Collectively, the CPU 215, GPU 220, and associated chipset may be described as a source device 210, which provides one or more communicative connections upon which data is transmitted to and/or received from the signal conditioning arrangement 100. In some embodiments, more than one source device may connect with a particular signal conditioning arrangement 100.

The chipset may include one or more modules that enable communications according to different standards. In some cases, the modules may be implemented as one or more ICs. As shown, the computing device 205 includes four communication modules 225, 230, 235, and 240. Each of the communications modules may support a respective communications standard. Some of the communication modules may be connected with one or both of the CPU 215 and GPU 220. As an example, module 225 230 supports USB 3.1 communications, module 230 supports PCIe communications, module 235 supports Thunderbolt communications, and module 240 supports DisplayPort communications. Of course, alternative configurations are possible using different standards. Additionally, in some cases multiple modules for a particular standard may be used to overcome limitations of bandwidth, numbers of supported devices, etc.

The signal conditioning arrangement 100 is coupled with the modules 225, 230, 235, 240 through respective connections 245, 250, 255, 260. The connections may be electrical, electromagnetic, or optical, such as wires, traces, fibers, etc. Consistent with the description provided with respect to FIG. 1, the signal conditioning arrangement 100 performs processing on input signals received from the modules 225, 230, 235, 240, and drives output signals that are based on the processed input signals to the outputs 265, 270. In some embodiments, the signal conditioning arrangement 100 may also receive input signals from the outputs 265, 270, decompose and/or otherwise process the received signals, and drive output signals onto the connections 245, 250, 255, 260.

The driven output signals may include selected combinations of the received input signals. In some embodiments, different lanes of a particular output 265, 270 may be driven with signals compliant with different communications standards and/or at different data rates. For example, an output 265, 270 may correspond to a USB Type-C connection, and one or more lanes of the output 265, 270 may be driven with input signals compliant with DisplayPort communications, one or more lanes driven with PCIe communications, one or more lanes driven with USB communications, and so forth. In some cases, the signal conditioning arrangement 100 may operate to provide a reduced number of output ports for a particular computing device 205 while still supporting a larger number of inputs that use different communications standards.

As will be discussed, the signal conditioning arrangement 100 may be useful to provide docking connector(s) for the computing device 205. The signal conditioning arrangement 100 may also be used in conjunction with computing devices that include legacy chipsets. For example, say one or more of the modules 225, 230, 235, 240 supports one or more earlier or superseded communication standards. Using the signal conditioning arrangement 100 enables the computing device 205 to be compatible with current communications standards (e.g., transmitting legacy signals using an updated architecture).

Of course, the particular configuration of output signals driven onto the outputs 265, 270 need not be static. In some embodiments, the configuration of output signals may be updated by the allocation component 128 of the signal conditioning arrangement 100. For example, an output's configuration may be determined during the initialization of a communication session for the output, maintained during the session, and updated upon initialization of a next session. In another example, the output's configuration may be adapted during a particular communication session.

The output signals driven onto the outputs 265, 270 are received by one or more connected I/O devices 275. The I/O devices 275 may include one or more tiers of connected devices—as shown, an optional docking device 280 connects with outputs 265, 270, and input devices 285, output devices 290, and one or more computing devices 295 connect to the docking device 280. Beyond the docking device 280, some other examples of an intermediate device are a hub, a port replicator, and so forth. In other examples, the input devices 285, output devices 290, and/or computing devices 295 may connect directly with the outputs 265, 270 (i.e., without connection through an intermediate device).

Input devices 285 generally include any device that is suitable for providing input to an electronic system (e.g., the computing devices 205, 295). Some non-limiting examples of input devices 285 include user input devices such as a keyboard, mouse, joystick, trackball, remote control, and so forth. Other examples include sensor-based devices such as a touchpad, touch sensor device, visual sensor, audio sensor, and so forth. Other examples include memory-based storage elements such as a Flash memory, a hard disk drive, a solid state drive, an optical storage device, and/or a magnetic storage device.

Output devices 290 generally include any device that is suitable for transmitting or presenting data received from an electronic system. Some non-limiting examples of output devices 290 include user-oriented devices such as audio output devices and visual output devices. Audio output devices may include conventional audio speakers having any suitable form factor (e.g., standalone, integrated in a stereo, headphones, etc.), as well as devices using alternative methods of producing sound perceptible by a person, such as bone conduction transducers in a worn device. Visual output devices may include display screens of any suitable technology—for example, light emitting diode (LED), organic LED (OLED), cathode ray tube (CRT), liquid crystal display (LCD), plasma, or electroluminescence (EL)—and various visual indicators such as LEDs. Other types of sensory devices may also be included in output devices 290, such as haptics (touch feedback) devices.

In some cases, certain input devices 285 and output devices 290 may be implemented as integrated or composite devices. For example, the memory-based storage elements provided as an example of input devices 285 may also serve as output devices 290, as a computing device 205 or other communicatively connected device may read from and write to the storage elements. In another example, a display screen (output device) may be integrated with a touch sensor device (input device) to form a touchscreen device.

Like computing device 205, the computing devices 295 may have any suitable form factor, such as desktop computers, laptop computers, netbook computers, tablets, communication devices, media devices, etc. The computing devices 295 may or may not include a signal conditioning arrangement 100.

The docking device 280 generally includes a plurality of interfaces for connecting with the input devices 285, the output devices 290, and with the computing devices 205, 295. The interfaces may be of the same type or may include different types. In one example, the docking device 280 may include USB Type-C connectors for connecting to outputs 265, 270. The docking device 280 may include logic expanding the capabilities of a connected computing device 205, for example, a network interface card for connecting with a local area network (LAN) or wide area network (WAN). The docking device 280 may also include logic to allocate and/or convert received signals. In one embodiment, the docking device 280 may include a signal conditioning component 100 that is capable of combining, decomposing, and/or redistributing received signals to drive output signals onto different ports or interfaces.

Figure 3:
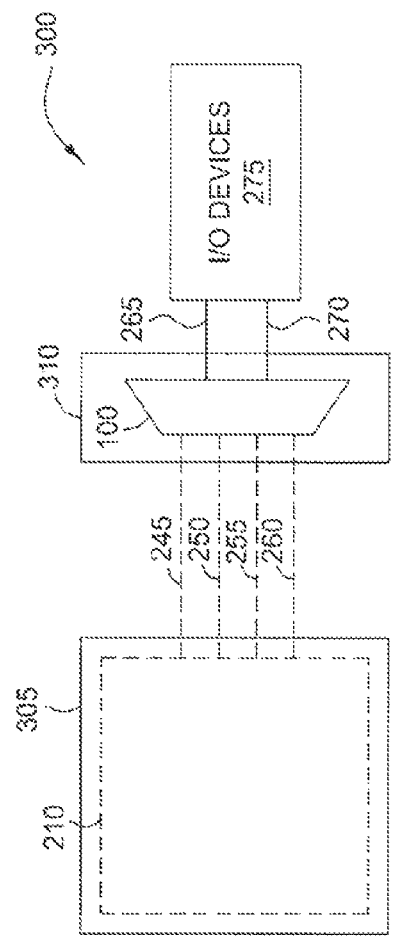
FIG. 3 illustrates a system including a signal conditioning arrangement, according to one embodiment.

FIG. 3 illustrates a system 300 including a signal conditioning arrangement, according to one embodiment. The system 300 generally represents one alternative embodiment of the system 200. System 300 includes a computing device 305, which in turn includes a source device 210. Notably, the computing device 305 does not include a signal conditioning arrangement 100. Instead, a signal conditioning device 310 external to the computing device 305 includes signal conditioning arrangement 100. The signal conditioning device 310 may be implemented as a docking device, a conversion device, an expansion device, etc. In some embodiments, the source device 210 provides one or more connections 245, 250, 255, 260 to the signal conditioning arrangement 100. The connections may include wired, wireless, optical connections, etc. The signal conditioning arrangement 100 generally operates to receive input signals using the connections 245, 250, 255, 260, to condition the received signals, to allocate the signals to different (lanes of) outputs 265, 270, and to drive output signals based on combinations of the various input signals onto the outputs 265, 270. As discussed above, the signal conditioning arrangement 100 may support bidirectional communication, such that the outputs 265, 270 may also receive input signals from the I/O devices 275, which are then processed by the signal conditioning arrangement 100 and output across connections 245, 250, 255, 260 to the computing device 305. The signal conditioning arrangement 100 may further support communications between I/O devices 275 and between different source devices 210 and/or different communications modules of source device 210.

Figure 4:
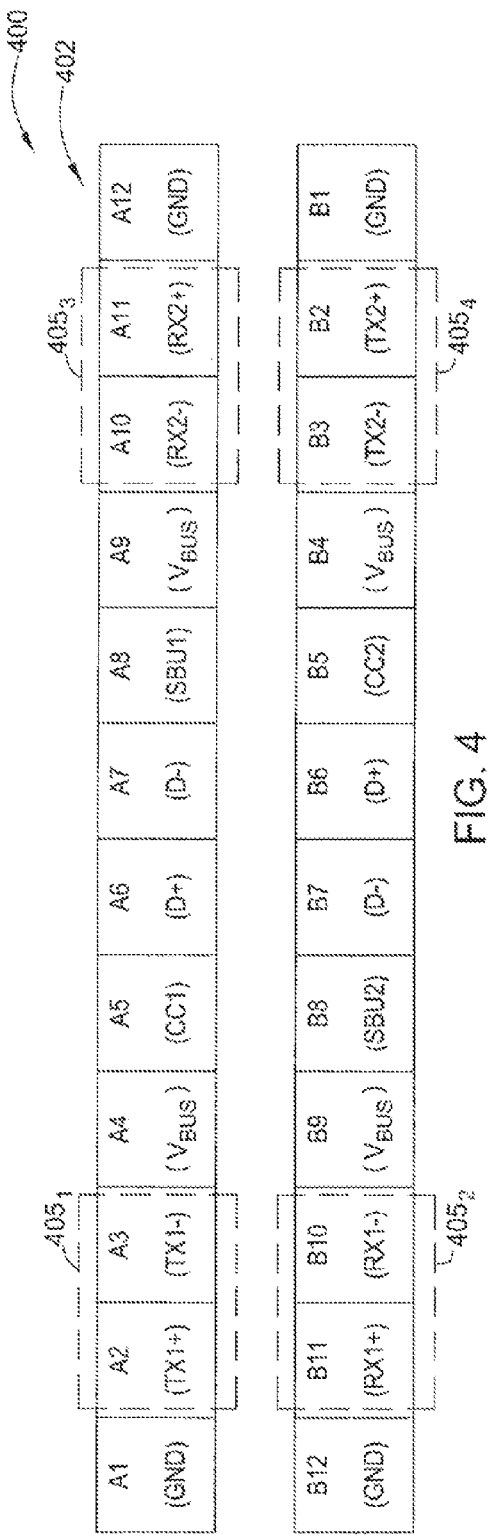
FIG. 4 is a pinout of an exemplary output port of a signal conditioning arrangement, according to one embodiment.

FIG. 4 is a pinout 400 of an exemplary output port of a signal conditioning arrangement, according to one embodiment. The pinout 400 generally corresponds to a USB Type-C connector 402, but the person of ordinary skill will understand that the principles and techniques discussed herein may be applied to different types of physical connections.

The connector 402 includes twenty-four pins (A1-A12 and B1-B12) generally used to support session configuration, data communications and power transfer between devices, and so forth. For example, several pins provide a ground voltage (A1, A12, B1, B12) and a bus voltage (A4, A9, B4, B9). The connector 402 includes four high-speed data lanes $405_{1-4}$, each of which includes two pins for carrying a unidirectional differential signal. In some embodiments, one or more rules govern the configuration of data lanes 405. Certain data lanes 405 may be grouped to provide a bidirectional connection with an attached device. For example, the lanes $405_{1,2}$ may support a bidirectional USB 3.1 connection, at up to 10 Gbps in each direction. In some embodiments, the possible lane groupings may be specified. For example, a USB Type-C connector may be operated according to the Video Electronics Standards Association (VESA) DisplayPort Alternate Mode Standard, which allows the four high-speed lanes 405 to be configured as four lanes of DisplayPort signaling, as two lanes of DisplayPort and two lanes of USB 3.1, or as four lanes of USB 3.1.

Notably, depending on the orientation of the connector 402, the pins A6 and A7 (or B6 and B7) form a data lane that is configured to carry a legacy USB 2.0 signal (having a maximum data rate of 480 Mbps). While not explicitly discussed in the subsequent figures, the person of ordinary skill will understand that such a data lane, though supporting slower data rates than any of the lanes $405_{1-4}$, may also be used by an allocation component for allocating received input signals to outputs.

Figure 5:
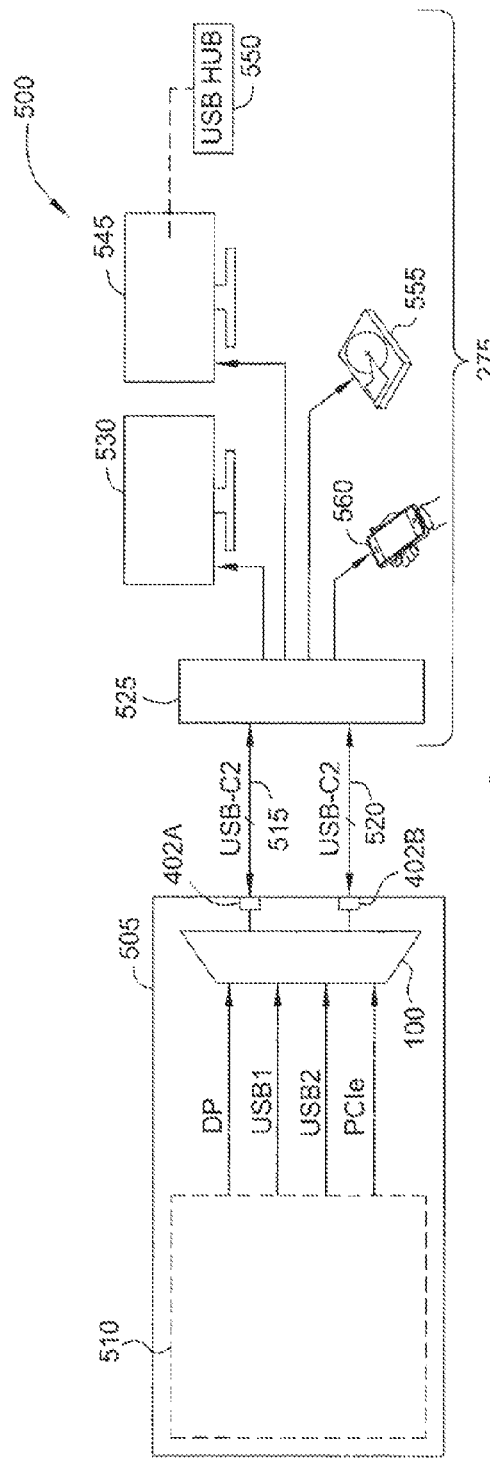
FIG. 5 illustrates an exemplary implementation of a system including a signal conditioning arrangement, according to one embodiment.

FIG. 5 illustrates an exemplary implementation of a system including a signal conditioning arrangement, according to one embodiment. The system 500 includes a computing device 505, which includes a source device 510 having several I/O connections with the signal conditioning arrangement 100. As shown, the connections include a DisplayPort connection (DP), two USB connections (USB1, USB2), and a PCIe connection (PCIe). Each of the connections may include one or more data lanes.

The signal conditioning arrangement 100 provides two USB Type-C connectors 402A, 402B, which are coupled through respective cabling 515, 520 to a number of I/O devices 275. As shown, the I/O devices 275 include a docking device 525 coupled with a video monitor 530, an integrated video monitor 545 (including a USB hub 550), a hard drive 555, and a mobile smartphone 560. Of course, the I/O devices 275 are provided as one example, and other configurations are possible.

In some embodiments, the allocation performed by the signal conditioning arrangement 100, which may include combining various input signals onto outputs, may be based on the types of data received with the input signals and/or the types of devices connected with the signal conditioning arrangement 100. In some embodiments, certain I/O devices 275, upon connection with the docking device 525, may be identified using a "discovery" process performed by the docking device 525. Alternatively, the discovery process may be performed by another component, such as the signal conditioning arrangement 100, or another component of the source device 510.

In one example, the docking device 525 "discovers" the integrated video monitor 545, determining that the bandwidth to support the native resolution of the integrated video monitor 545 requires only two lanes of DisplayPort data. Knowing that the integrated video monitor 545 also includes a USB hub 550, the signal conditioning arrangement 100 may allocate the four high-speed lanes of a single USB Type-C connector 402A or 402B to support two unidirectional DisplayPort lanes and the bidirectional USB connection (i.e., two lanes) with the integrated video monitor 545.

While the signal conditioning arrangement 100 could separate the required DisplayPort and USB lanes for the integrated video monitor 545 onto separate connections from the signal conditioning arrangement 110 (say, allocate DisplayPort data onto connector 402A and USB data onto connector 402B), in some cases it may be advantageous to minimize the number of output ports used. For example, the integrated video monitor 545 may be connected to the docking device 525 through a single USB Type-C connection, and the allocation of the received signals onto a single connector 402A or 402B may be performed to naturally align with the USB Type-C connection with the integrated video monitor 545. Conserving available output ports may potentially reduce the amount of processing required by the docking device 525 to decompose and/or rearrange signals into separate data lanes. Additionally, conserving available output ports may provide the signal conditioning arrangement 100 greater flexibility to accommodate changes to the set of connected I/O devices (e.g., plugging in new devices, unplugging devices, changes to the number of active data lanes, etc.).

In some embodiments, one or more types of communications may be included within a particular type of connection. For example, a Thunderbolt connection (not shown) with the signal conditioning arrangement 100 may include both DisplayPort and PCIe communications. The Thunderbolt standard generally supports multiplexing the DisplayPort and PCIe signals at one end of the Thunderbolt connection, and demultiplexing the Thunderbolt signal into the component signals at the other end of the connection. While the signal conditioning arrangement 100 may be configured to support communications connections that use such multiplexing schemes, the signal conditioning arrangement 100 itself does not need to perform multiplexing to contemporaneously transmit different types of communications. Instead, in some embodiments, the signal conditioning arrangement 100 conditions received signals using repeater circuitry configured to support different data rates, and allocating the signals to different outputs.

FIG. 6 is a chart 600 illustrating an exemplary set of allocations for a signal conditioning arrangement, according to one embodiment. Generally, the signal conditioning arrangement corresponds to the signal conditioning arrangement 100 as configured in FIG. 5. The chart 600 includes a column 605 representing a type or configuration of a source device coupled with the signal conditioning arrangement, a column 610 representing which inputs of the signal conditioning arrangement 100 are active (i.e., used for receiving and/or transmitting to the source device), and a column 615 representing allocation of the lanes of connections 402A, 402B. The column 615 is separated into two sub-columns 620, 625 reflecting allocation of individual connections 402. For purposes of this example, the connections 402A, 402B correspond to USB Type-C connections, although in other embodiments, the connections may correspond to different types of connections.

In some embodiments, certain information depicted in the chart 600 may be stored in a memory of the signal conditioning arrangement. For example, the example allocations relating a particular set of active input(s) (see column 610)

to the connections 402A, 402B may be used to configure subsequent communication sessions having the same or a similar set of active input(s).

Chart 600 illustrates allocations for a number of different configurations 630, 635, 640, 645, 650, 655, 660 of a source device coupled with the signal conditioning arrangement. While the various configurations include different descriptors—"mobile computing device," "personal computer," etc.—these descriptors are included as example implementations that would be readily understood. Alternative configurations are possible.

Configuration 630 represents an example configuration of a mobile computing device such as a smartphone, tablet, etc. connected with the signal conditioning arrangement. Relative to other computing platforms, a mobile computing device in some cases may support a relatively limited set of connections. For example, configuration 630 shows support for two lanes of DisplayPort data (on DP) and a single bidirectional USB connection (on USB1). The signal conditioning arrangement allocates the two lanes of DisplayPort at 8.1 Gbps onto two high-speed lanes of the connection 402A, and the two lanes for the bidirectional USB connection at 10 Gbps onto the other two high-speed lanes of the connection 402A. The four high-speed lanes of connection 402B remain unused and generally available for allocation.

Configuration 635 represents an example configuration of a personal computer such as a desktop or laptop computer connected with the signal conditioning arrangement. For example, the personal computer may drive high-resolution display(s), such as one or more 4K ultra-high-definition (UHD; alternatively referred to as 2160p) displays, 5K, 8K (4320p), or beyond. Upon determining that the personal computer requires four lanes of DisplayPort data, the signal conditioning arrangement allocates the four high-speed lanes of connection 402A. The four high-speed lanes of connection 402B remain available for allocation.

Configuration 640 represents another example configuration of a personal computer. The personal computer may drive high-resolution display(s) in addition to operating a plurality of USB connections. Upon determining that the personal computer requires four lanes of DisplayPort data, one bidirectional USB connection at 10 Gbps, and one bidirectional USB connection at 5 Gbps, the signal conditioning arrangement allocates the four lanes of DisplayPort at 8.1 Gbps onto the four high-speed lanes of connection 402A. The two lanes for the bidirectional USB connection at 10 Gbps are allocated onto two high-speed lanes of the connection 402B, and the two lanes for the bidirectional USB connection at 5 Gbps are allocated onto the other two high-speed lanes of connection 402B.

Configuration 645 represents an example configuration of a workstation computer. The workstation computer includes one bidirectional USB connection at 10 Gbps and one bidirectional PCIe connection at 8 Gbps. The signal conditioning arrangement allocates the bidirectional USB connection at 10 Gbps onto two high-speed lanes of the connection 402A, and the bidirectional PCIe connection at 8 Gbps onto the other two high-speed lanes of the connection 402A. The four high-speed lanes of connection 402B remain available for allocation.

Configuration 650 represents another example configuration of a workstation computer. The workstation computer includes one bidirectional USB connection at 10 Gbps, one bidirectional USB connection at 5 Gbps, and two bidirectional PCIe connections at 8 Gbps. The signal conditioning arrangement allocates the bidirectional USB connection at 10 Gbps onto two high-speed lanes of the connection 402A, and the bidirectional USB connection at 5 Gbps onto the other two high-speed lanes of the connection 402A. The two bidirectional PCIe connections at 8 Gbps are allocated onto the four high-speed lanes of the connection 402B.

Configuration 655 represents an example configuration of a workstation computer that supports a Thunderbolt connection. As discussed above, the Thunderbolt standard supports the multiplexing of DisplayPort and PCIe communications. As shown, the workstation computer includes four DisplayPort connections at 8.1 Gbps, and two bidirectional PCIe connections at 8 Gbps. The signal conditioning arrangement allocates the four lanes of DisplayPort onto the four high-speed lanes of connection 402A, and the two bidirectional PCIe connections at 8 Gbps allocated onto the four high-speed lanes of the connection 402B.

Configuration 660 represents another example configuration of a workstation computer. The workstation computer includes two lanes of DisplayPort at 8.1 Gbps, one bidirectional USB connection at 10 Gbps, one bidirectional USB connection at 5 Gbps, and one bidirectional PCIe connection at 8 Gbps. The signal conditioning arrangement allocates the two lanes of DisplayPort at 8.1 Gbps onto two of the high-speed lanes of connection 402A, and the bidirectional PCIe connection at 8 Gbps onto the other two lanes of connection 402A. The USB connections at 5 Gbps and 10 Gbps are allocated onto the four high-speed lanes of the connection 402B.

Figure 7:
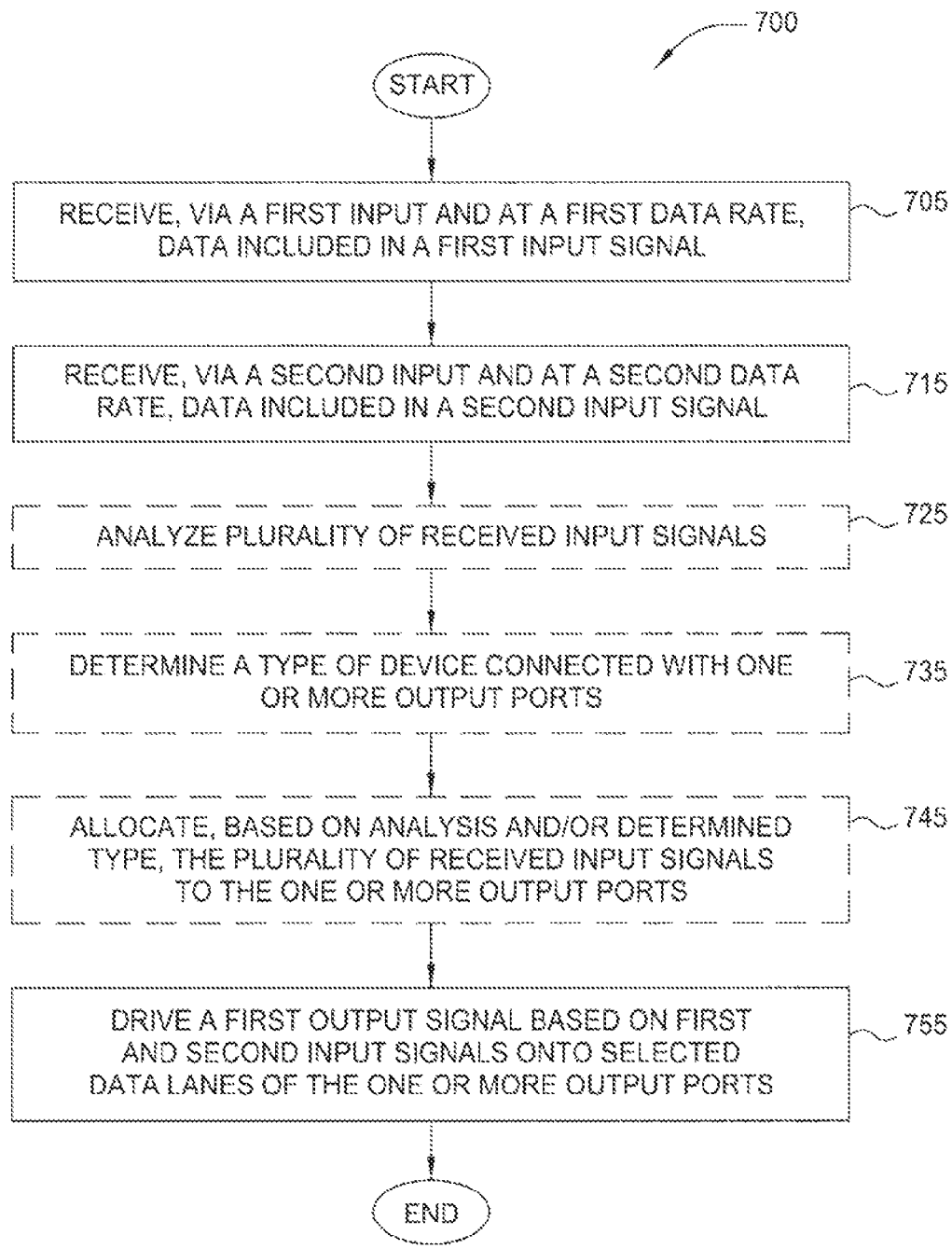
FIG. 7 is a block diagram illustrating a method of signal conditioning, according to one embodiment.

FIG. 7 is a block diagram illustrating a method of signal conditioning, according to one embodiment. In some embodiments, the method may be performed by a discrete signal conditioning arrangement. Method 700 begins at block 705, where data of a first input signal is received at a first input and at a first data rate. At block 715, data of a second input signal is received at a second input and at a second data rate. In some embodiments, the second data rate differs from the first data rate. In some embodiments, the first and second input signals may correspond to different communication standards, such as USB, DisplayPort, PCIe, Thunderbolt, and so forth.

At block 725, the plurality of received input signals is optionally analyzed. In some embodiments, the signal conditioning arrangement performs this block. In some embodiments, the analysis determines properties of the data included in the input signals, such as the data rate, a type of the data (e.g., video data), etc. At block 735, a type of device(s) connected with one or more output ports of the signal conditioning arrangement is optionally determined. In some embodiments, the type and/or other information suitable for identifying the device is acquired during a "discovery" process performed by the signal conditioning arrangement and/or a communicatively coupled component.

At block 745, the plurality of received input signals are allocated to the one or more output ports, based on the analysis of the input signals and/or the determined type(s) of connected device(s). In some embodiments, the allocations include combining data lanes from different input signals—which may operate at different data rates—onto a common output port.

At block 755, the signal conditioning arrangement drives a first output signal based on the received first and second input signals onto selected data lanes of the one or more output ports. This block may further include performing signal conditioning using repeater circuitry. In some embodiments, the repeater circuitry is configured to support multiple data rates. For example, a single output port may output multiple signals at differing data rates, each of the multiple signals being driven on one or more data lanes of the output port. In some embodiments, one or more output ports may drive data at different rates simultaneously and concurrently with one or more other output ports driving data at a single data rate. Method 700 ends following completion of block 755.

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. A signal conditioning circuit, comprising:
   a first input configured to receive data included in a first input signal at a first data rate;
   a second input configured to receive data included in a second input signal at a second data rate different from the first data rate, wherein the first input signal and the second input signal are included in a plurality of received input signals;
   a plurality of output ports comprising a first output port, the first output port comprising at least first and second data lanes operable at different data rates; and
   a processing component coupled with the first and second inputs, the processing component comprising an allocation component configured to:
   perform an analysis of the plurality of received input signals;
   determine a device type of a device connected with one or more of the plurality of output ports; and
   allocate, based on the analysis and the device type, each of the received input signals to a corresponding one of the plurality of output ports,
   wherein the processing component is configured to drive a first output signal based on the first and second input signals onto the first output port, wherein driving the first output signal comprises:
   transmitting the data included in the first input signal on the first data lane; and
   transmitting the data included in the second input signal on the second data lane.

2. The signal conditioning circuit of claim 1, wherein the processing component comprises one of retimer circuitry and re-driver circuitry for conditioning the received first and second input signals prior to driving the first output signal.

3. The signal conditioning circuit of claim 1, wherein the allocation component is further configured to allocate each of the received input signals to one or more corresponding data lanes within the allocated output port.

4. The signal conditioning circuit of claim 1, wherein the first input and the second input correspond to different interfaces.

5. The signal conditioning circuit of claim 4, wherein the respective interfaces of the first input and the second input are each selected from a DisplayPort interface, a Universal Serial Bus (USB) interface, a USB Type-C interface, a Peripheral Component Interconnect Express (PCIe) interface, and a Thunderbolt interface.

6. The signal conditioning circuit of claim 1, wherein the processing component is further configured to receive data using the first and second data lanes.

7. The signal conditioning circuit of claim 1, wherein determining the device type of the device comprises:
   receiving, prior to establishing a communications session with the device, type data or class data from the device.

8. The signal conditioning circuit of claim 7, further comprising a memory storing device type information,
   wherein determining the device type of the device further comprises:
   referencing the type data or class data against the stored device type information.

9. The signal conditioning circuit of claim 1, wherein the analysis of the plurality of received input signals indicates that the first input signal comprises video data,
   wherein allocating each of the received input signals to a corresponding one of the plurality of output ports comprises:
   determining that the first output port supports video data;
   determining that a second output port of the plurality of output ports does not support video data; and
   allocating the first input signal to the first output port.

10. The signal conditioning circuit of claim 1, wherein allocating each of the received input signals to a corresponding one of the plurality of output ports comprises:
    operating physical switching elements to form paths between a plurality of input ports and the plurality of output ports.

11. A method of signal conditioning using a processing component coupled with at least first and second inputs and further coupled with a plurality of output ports comprising a first output port including first and second data lanes operable at different data rates, the method comprising:
    receiving, via the first input and at a first data rate, data included in a first input signal;
    receiving, via the second input and at a second data rate different from the first data rate, data included in a second input signal, wherein the first input signal and the second input signal are included in a plurality of received input signals;
    performing an analysis of the plurality of received input signals;
    determining a device type of a device connected with one or more of the plurality of output ports;
    allocating, based on the analysis and the device type, each of the received input signals to a corresponding one of the plurality of output ports; and
    driving, based on the first and second input signals, a first output signal onto the first output port, wherein driving the first output signal includes:
    transmitting the data included in the first input signal on the first data lane; and
    transmitting the data included in the second input signal on the second data lane.

12. The method of claim 11, wherein the processing component comprises one of retimer circuitry and re-driver circuitry for conditioning the received first and second input signals prior to driving the first output signal.

13. The method of claim 11, wherein the allocation further includes allocating each of the received input signals to one or more corresponding data lanes within the allocated output port.

14. The method of claim 11, wherein the first input and the second input correspond to different interfaces.

15. The method of claim 14, wherein the respective interfaces of the first input and the second input are each selected from a DisplayPort interface, a Universal Serial Bus (USB) interface, a USB Type-C interface, a Peripheral Component Interconnect Express (PCIe) interface, and a Thunderbolt interface.

16. The method of claim 11, wherein the processing component is further configured to receive data using the first and second data lanes.

17. A system, comprising:
one or more source devices configured to produce a first signal at a first data rate, and a second signal at a second data rate different from the first data rate; and
a signal conditioning circuit including at least first and second inputs coupled with respective outputs of the one or more source devices, and further including a plurality of output ports comprising a first output port, wherein the signal conditioning circuit is configured to:
receive the produced first and second signals at the first and second inputs, wherein the first signal and the second signal are included in a plurality of received input signals;
perform an analysis of the plurality of received input signals;
determine a device type of a device connected with one or more of the plurality of output ports;
allocate, based on the analysis and the device type, each of the received input signals to a corresponding one of the plurality of output ports; and
drive a first output signal onto the first output port based on the received first and second signals, the first output port including at least first and second data lanes operable at different data rates, wherein driving the first output signal comprises:
transmitting the data included in the first input signal on the first data lane; and
transmitting the data included in the second input signal on the second data lane.

18. The system of claim 17, wherein the signal conditioning circuit comprises one of retimer circuitry and re-driver circuitry for conditioning the received first and second input signals prior to driving the first output signal.

19. The system of claim 17, wherein the respective interfaces of the first input and the second input are each selected from a DisplayPort interface, a Universal Serial Bus (USB) interface, a USB Type-C interface, a Peripheral Component Interconnect Express (PCIe) interface, and a Thunderbolt interface.

20. The system of claim 17, wherein the signal conditioning circuit is included in a docking device that is separate from the one or more source devices and from the device connected with the one or more of the plurality of output ports.

* * * * *